Sept. 14, 1943.  R. POLK, SR.  2,329,555
APPARATUS FOR TREATING PEELED CITRUS FRUITS
Filed Nov. 6, 1939   2 Sheets-Sheet 1
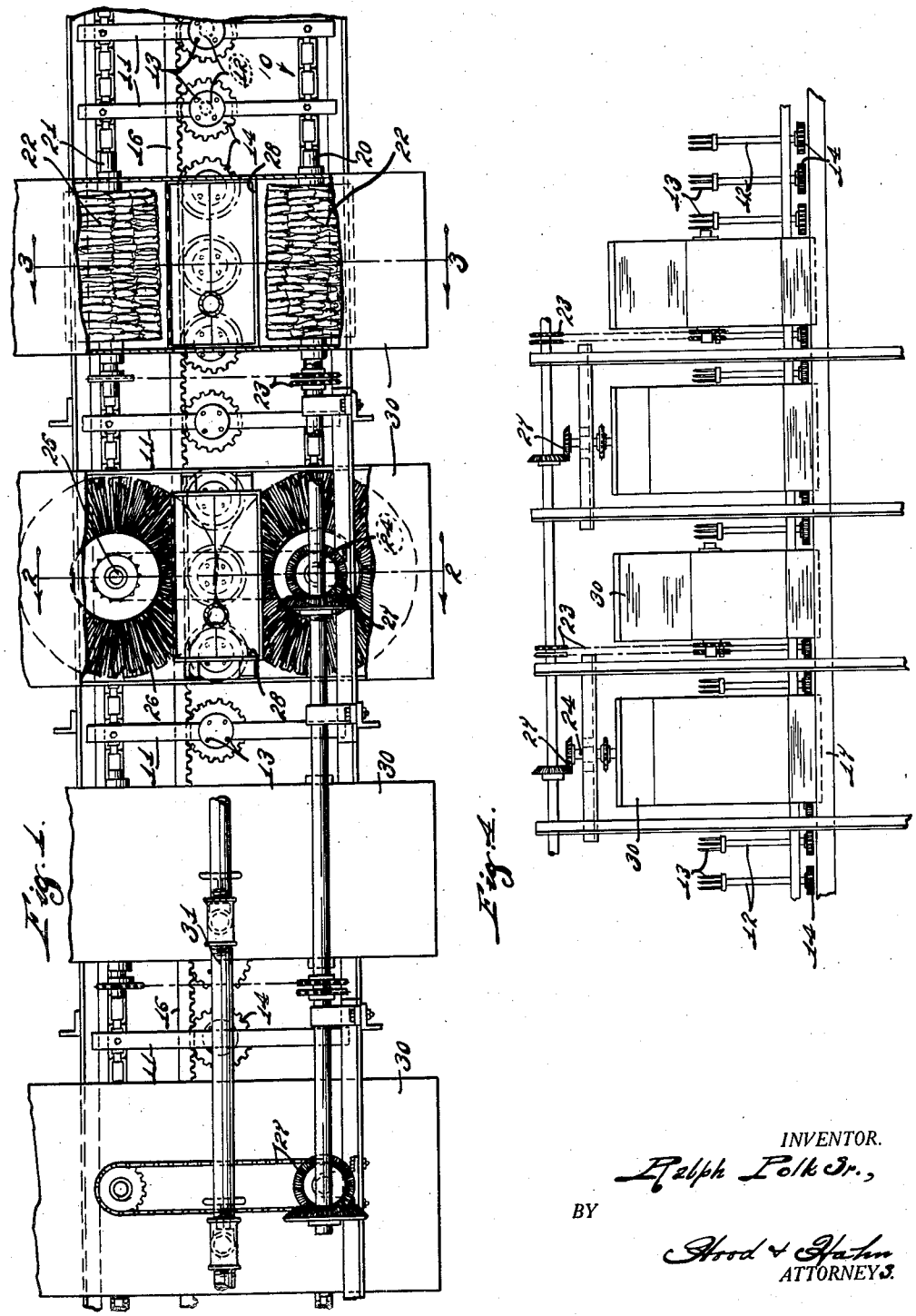
INVENTOR.
Ralph Polk Jr.,
BY
Hood & Hahn
ATTORNEYS.

Sept. 14, 1943. R. POLK, SR. 2,329,555
APPARATUS FOR TREATING PEELED CITRUS FRUITS
Filed Nov. 6, 1939 2 Sheets-Sheet 2
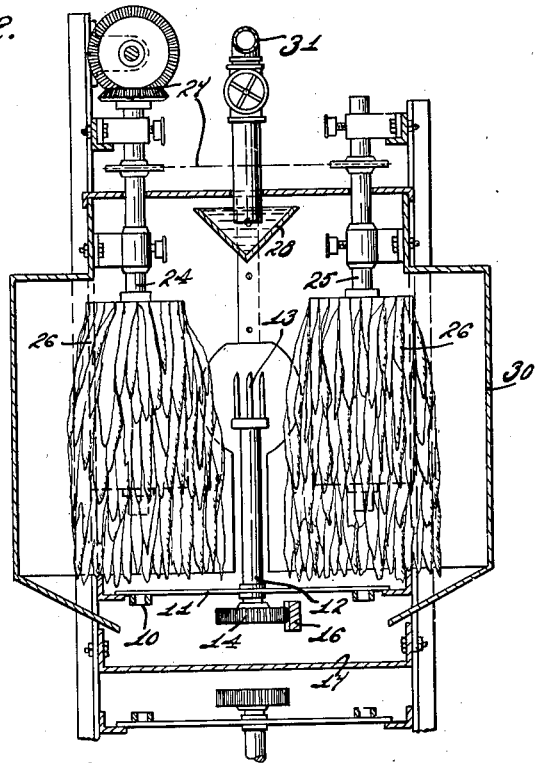
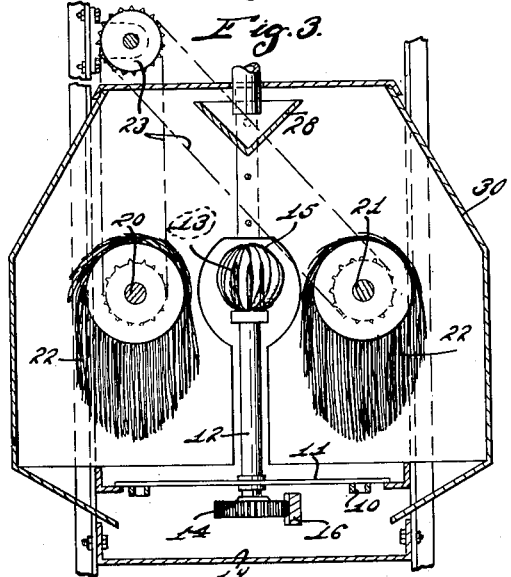
INVENTOR.
Ralph Polk Sr.,
BY
Hood & Hahn.
ATTORNEYS.

Patented Sept. 14, 1943

2,329,555

UNITED STATES PATENT OFFICE 2,329,555

APPARATUS FOR TREATING PEELED CITRUS FRUITS

Ralph Polk, Sr., Miami, Fla., assignor to The Polk Development Company, (not incorporated), Tampa, Fla., a copartnership of Florida Application November 6, 1939, Serial No. 302,972

13 Claims. (Cl. 146—3)

For the purpose of obtaining substantially-whole, integument-free segments of citrus fruits, such as grape fruit and oranges, it is necessary to remove not only the skin but the very thin integuments which circumferentially bound the juice-cell groups or segments, and the fibres or "rag" which lie between the skin and fruit ball and, to some extent, adhere to the fruit ball when the skin is removed.

The object of the present invention is to provide improved means by which peeled citrus fruits may be more efficiently denuded of "rag" and circumferential integuments with less injury to the fruit ball than has heretofore been accomplished.

The accompanying drawings illustrate embodiments of my invention:

Fig. 1 is a plan of an embodiment of an improved apparatus;

Fig. 2 is a vertical section on line 2—2 of Fig. 1;

Fig. 3 is a vertical section on line 3—3 of Fig. 1; and

Fig. 4 is a fragmentary elevation with the return run of endless carrier not shown.

In the drawings 10 indicates an endless carrier comprising a spaced series of journal bars 11 in each of which is journalled a shaft 12 to which is secured a fork 13 and a gear 14. The fork 13 comprises a circular series of parallel tines upon which a peeled fruit 15 may be impaled, the tines preferably penetrating the apices of fruit segments between radial portions of the bounding integuments of the fruit segments. The gears 14, during their upper run, mesh with a rack 16 so that, as carrier 10 moves, the forks 13 (and fruit thereon) will be rotated on the axes of their respective shafts 12.

The upper run of carrier 10 traverses a chute or trough 17.

Arranged alongside the path of travel of the forks during their upper run, on each side thereof, are horizontal shafts 20 and 21 each of which carries a plurality of radiating wipers 22 preferably of light narrow fabric of such length that, when extended by reason of rotation of shafts 20 and 21, will reach beyond the polar axes of the fruits on the forks. Shafts 20 and 21 are arranged on opposite sides of the forks approximately in the horizontal plane of the middles of fruit impaled on the forks. The shafts are provided with driving means 23 by which they may be rotated in the same direction so that the wipers of one shaft will be driven upwardly against the impaled fruit and wiped upwardly over the lower zones of the fruit and the wipers of the other shaft will be wiped downwardly over the upper zones of the fruit.

Also arranged alongside the path of travel of the impaled fruit, on each side thereof, are vertical shafts 24 and 25 which carry radiating wipers 26, like wipers 22. These shafts are provided with driving means 27 by which they may be rotated so as to cause their wipers to wipe the impaled fruits preferably in a direction opposite to the direction of rotation of the fruits.

Arranged over the wipers 22 and 26 are nozzles or troughs 28 connected to a source of supply of a heated aqueous solution of caustic soda or other suitable solvent or softener of the fruit rag and integuments.

We have found that an approximate 5% solution heated to near its boiling point, commonly used in the art as a bath for peeled fruits, is satisfactory.

The shafts 20, 21, 24 and 25 are rotated at relatively low speeds so that their wipers, charged with caustic, will be laid upon and gently wiped over the peeled fruits.

The wipers 22 and 26 are surrounded by splash guards 30 and, during operation, are kept constantly moist with the caustic solution.

It has been found, in practice, that beneficial results are attained by the practice of the following method. The caustic solution is applied to the first set of wipers so as to thoroughly moisten them without substantial excess, and these wipers are dragged gently over the entire area of the fruit so as to apply a light coating of caustic which is considerably cooler than the caustic as it arrives on the wipers. During this application of the caustic it attacks the integument and rag and by the time of application of the last of the first set of wipers, the outer parts of integument and rag have become so soft that the final wipers of the first set act to begin removal of the externals of the softened parts and at the same time to apply additional caustic. There is, then, a period time required to carry the fruits to the next set of wipers, during which the undisturbed caustic penetrates more deeply into the integuments and rag so that the second set of wipers serve not only to apply fresh caustic but to gently rub off the softened parts. There is then a second period during passage from the second set of wipers to the third set during which there is still further penetration of the caustic, followed by another wiping. Alternate wipings and rest periods to permit caustic penetration, followed by a final cleansing by a fresh water wash, as by spray or wiper application, results in thoroughly cleaned fruit which has been penetrated by heat to a minimum extent.

Where the fruit is overripe, as, for instance, Marsh Seedless grapefruit, where peeling has served to open the blossom end of the core, the peeled fruit should be impaled on the forks blossom-end down, thus thoroughly preventing entry of caustic into the open core. By this means, it has been found possible to prevent core disintegration so that such fruit, while fully denuded, retains the natural bond between the inner parts of the radial integuments so that removal of the whole juice-cell-groups, or segments, from the integuments is greatly facilitated.

The repeated applications of caustic by the wipers, with intermediate periods during which the caustic is permitted undisturbed penetration, makes it possible for the caustic to soften the integuments in the creases of the fruit and the wiper-removal of most of this softened material from the creases, the remainder being removed by washing, either by spraying or wiper application.

I claim as my invention:

1. Apparatus for processing fruit, especially peeled citrus fruits, comprising a rotary fruit holder, means for rotating said holder, a shaft arranged alongside said holder on an axis at a substantial angle to the axis of the holder, a flexible wiper composed of strips of non-cutting fabric radiating from said shaft and having a length sufficient to contact and substantially overlie the surface of the fruit on the holder, means by which said shaft may be rotated so as to drag the wiper lengthwise over the fruit, and means by which the holder may be shifted laterally.

2. Apparatus for processing fruits, especially peeled citrus fruits, comprising a rotary fruit holder, means for rotating said holder, a shaft arranged alongside said holder on an axis at a substantial angle to the axis of the holder, a flexible wiper composed of strips of non-cutting fabric radiating from said shaft and having a length sufficient to contact and substantially overlie the surface of fruit on the holder, means by which said shaft may be rotated so as to drag the wiper lengthwise over the fruit, means by which said wiper may be charged with treating material to be applied thereby to the fruit, and means by which the holder may be shifted laterally.

3. Apparatus for processing fruits, especially peeled citrus fruits, comprising a rotary fruit holder, means for rotating said holder, two shafts laterally spaced from the axis of said holder, flexible non-cutting fabric wipers radiating from said shafts and having lengths sufficient to engage and substantially overlie the surface of a fruit on the holder when the shafts are rotated, means for so rotating said shafts that the wipers of the two shafts will traverse the fruits in opposite directions, and means by which the holder may be transported laterally of its axis.

4. Apparatus for processing fruits, especially citrus fruits, comprising two shafts each carrying a radiating flexible wiper, a rotary fruit holder so arranged in the paths of travel of the free ends of said wipers that they will traverse a fruit on the holder in opposite directions, means by which said shafts and holder may be rotated, a third shaft, a radiating flexible wiper carried by said third shaft, means for rotating said third shaft, and means by which the wiper of the third shaft may be caused to engage and wipe a fruit on the holder in a plane at a substantial angle to the engagement of the plane of the wiper of one of the other shafts.

5. Apparatus for treating fruits comprising, a carrier upon which the fruit may be impaled, means for rotating and for transporting the carrier, a plurality of wipers arranged in spaced relation along the line of transportation of the carrier in such positions as to contact the impaled fruit on the carrier, and means for charging the wipers with suitable chemical, the arrangement being such that chemical applied to the fruit by one wiper may be undisturbed for a substantial period before the fruit is contacted by a succeeding wiper.

6. Apparatus for processing fruits, especially peeled citrus fruits, comprising a fruit holder capable of rotating a fruit about a fixed axis, a loose-end flexible, non-cutting, non-fruit-penetrating fabric wiper, means by which said wiper will be first applied to a fruit on the holder at a point intermediate the length of the wiper and the wiper be thence dragged lengthwise over and from the fruit, and means by which successive circumferential portions of the fruit may be presented to the wiper.

7. Apparatus for processing fruits, especially peeled citrus fruits, comprising a rotary fruit holder capable of rotating a fruit about a fixed axis, a flexible loose-end, non-cutting, non-fruit-penetrating fabric wiper, and means by which said wiper will be first applied to a fruit on the holder at a point intermediate the length of the wiper and the wiper be thence dragged lengthwise over and from the fruit.

8. Apparatus for processing fruits, especially peeled citrus fruits, comprising a rotary fruit holder capable of rotating a fruit about a fixed axis, means for rotating said holder, a flexible loose-end, non-cutting, non-fruit-penetrating fabric wiper, and means by which said wiper will be first applied to a fruit on the holder at a point intermediate the length of the wiper and the wiper be thence dragged lengthwise over and from the fruit on the holder.

9. Apparatus for processing fruits, especially peeled citrus fruits, comprising a rotary fruit holder capable of rotating a fruit about a fixed axis, means for rotating said holder, a flexible loose-end, non-cutting, non-fruit-penetrating fabric wiper, means by which said wiper will be first applied to the fruit on the holder at a point intermediate the length of the wiper and the wiper be thence dragged lengthwise over and from the fruit on the holder, and means by which said wiper may be charged with treating material to be applied thereby to the fruit.

10. Apparatus for processing fruits, especially peeled citrus fruits, comprising a rotary fruit holder capable of rotating a fruit about a fixed axis, means for rotating said holder, a rotary shaft arranged alongside said holder on an axis at a substantial angle to the axis of the holder, a flexible loose-end, non-cutting, non-fruit-penetrating fabric wiper radiating from said shaft and having a length sufficient, upon rotation of said shaft, to first contact the surface of the fruit on the holder at a point intermediate the length of the wiper, and means by which said shaft may be rotated.

11. Apparatus for processing fruits, especially peeled citrus fruits, comprising a rotary fruit holder capable of rotating a fruit about a fixed axis, means for rotating said holder, a rotary shaft arranged alongside said holder on an axis at a substantial angle to the axis of the holder, a flexible loose-end, non-cutting, non-fruit-penetrating fabric wiper radiating from said shaft and of a length sufficient to substantially initially overlie the surface of the fruit on the holder when the shaft is rotated, means by which said shaft may be rotated so as to first contact the wiper with the fruit at a point intermediate the length of the wiper and the wiper be thence dragged lengthwise toward its free end over the fruit, and means by which said wiper may be charged with treating material to be applied thereby to the fruit.

12. Apparatus for processing fruits, especially peeled citrus fruits, comprising a rotary fruit holder capable of rotating a fruit about a fixed axis, means for rotating said holder, two rotary shafts laterally spaced from the axis of said holder, flexible non-cutting, non-fruit-penetrating fabric wipers radiating from said shafts and having lengths sufficient, upon rotation of said shafts, to overlie the fruit and first engage the surface of the fruit on the holder at points intermediate the lengths of the wipers when the shafts are rotated and the wipers be thence dragged lengthwise over and from the surface of the fruit, and means for so rotating said shafts that the wipers of the two shafts will traverse the fruits in opposite directions.

13. Apparatus for processing fruits, especially peeled citrus fruits, comprising two rotary shafts each carrying a radiating flexible non-cutting, non-fruit-penetrating fabric wiper element, a rotary fruit holder capable of rotating a fruit about a fixed axis so arranged as to traverse the paths of travel of said wipers in such manner that the wipers will substantially overlie the fruit by first engaging the wipers at points intermediate the lengths of the wipers and the wipers be thence dragged lengthwise over and from the fruit on the holder in opposite directions, and means by which said shafts and holder may be rotated.

RALPH POLK, Sr.